United States Patent [19]
Zobel

[11] 3,737,773
[45] June 5, 1973

[54] TACHOMETER CIRCUIT

[75] Inventor: Don William Zobel, Tempe, Ariz.

[73] Assignee: Motorola, Inc., Franklin Park, Ill.

[22] Filed: July 28, 1971

[21] Appl. No.: 166,688

[52] U.S. Cl. .................. 324/166, 324/78 I, 324/173
[51] Int. Cl. ........ G01p 3/48, G01p 3/54, G01p 23/02
[58] Field of Search ...................... 324/166, 167, 168, 324/169, 173–174, 178, 160, 163, 78 I; 307/233, 295

[56] References Cited
UNITED STATES PATENTS

| | | | |
|---|---|---|---|
| 3,611,129 | 10/1971 | Simurda | 324/78 I |
| 3,546,600 | 12/1970 | Del Riesgo | 307/233 X |
| 3,563,219 | 2/1971 | Mieras | 324/169 |

*Primary Examiner*—Alfred E. Smith
*Attorney*—Mueller & Aichele

[57] ABSTRACT

A tachometer circuit is provided with a current steering circuit which has a first circuit portion connected to a power source. An input circuit portion of the steering circuit receives input pulse signals of different and/or indiscriminate pulse width which are indicative of the motion of a movable member to cause the output current of the steering circuit to be diverted from one current path to a second current path. A timing circuit is connected to the output circuit portion of the current steering circuit to produce a timed pulse of predetermined duration. Feedback means is provided for applying the timed pulse to the steering circuit to revert its state and again cause current to be directed through the first current path. This will produce a given-width pulse which is integrated with respect to time and used to produce a tachometer reading. An input lockout circuit is connected to the input circuit portion to shunt that portion of the input signal which exceeds the time duration of the given-width pulse.

12 Claims, 2 Drawing Figures

INVENTOR.
DON WILLIAM ZOBEL

Mueller & Aichele
BY
ATTORNEYS.

TACHOMETER CIRCUIT

BACKGROUND OF THE INVENTION

This invention relates generally to tachometer circuits which indicate the speed of rotation of such things as reciprocating engines, or the like.

Tachometer circuits have found wide-spread use in sensing the speed of rotation of piston type reciprocating engines for such equipment as racing cars, industrial power plants, and large earth moving or road building equipment. The necessity of a tachometer indication of engine RPM is manifested in more efficient engine operation. Thus, better fuel economy and/or increased engine life is obtained by operating the engine at the optimum engine speed for given load conditions.

Heretofore, such tachometer indication was often obtained by a direct mechanical connection with a gear or transmission component for mechanically driving a tachometer indicator or pointer. While this mechanical arrangement produced the accurate tachometer reading necessary to maintain optimum engine speed, it is subjected to mechanical wear and failure, and in some cases causes mechanical failure of other components such as fuel pumps, transmissions or other accessories which receive the mechanical connection of the tachometer.

To overcome these mechanical problems electronic pick-ups have been used to produce a pulse in response to rotation of some mechanical part of the engine. This pulse is then translated through a tachometer circuit and applied to an integrating circuit where a tachometer reading is developed. While this type of electronic pickup overcomes the problem of mechanical wear and failure of components it is often times associated with erroneous tachometer readings because of indiscriminate noise signals which become mixed with the input pickup signals generated. Therefore, if the tachometer circuit counts input pulses as well as noise pulses mixed therewith, an erroneous tachometer reading is likely to occur. This will prevent the engine from being operated at its designed maximum efficiency. It also causes a great difficulty in electronic governor means which may rely on the output of a tachometer circuit to electronically control the engine speed. That is, if the noise signals are mixed in with the actual pulses generated and then counted along with these pulses, these noise signals will cause continuous and undesired fluctuation of the engine speed through control of the governor system.

SUMMARY OF THE INVENTION

It is therefore an object of this invention to provide an improved tachometer circuit which overcomes the problems of electronic tachometers heretofore utilized.

Another object of this invention is to provide a tachometer circuit which prevents undesired noise signals from mixing with the regularly produced input pulses to prevent extraneous tachometer readings.

Yet another object of this invention is to provide a tachometer circuit which generates the given-width pulse to be integrated and used to operate a tachometer circuit regardless of the width of the input pulse.

Briefly, the tachometer circuit of this invention incorporates a flip-flop circuit and a pair of diodes at the output thereof to form a steering circuit. One of the inputs of the flip-flop circuit is connected to a pulse forming circuit which receives pulses in response to rotation of a moving member of an engine or the like. A second input of the flip-flop is connected to a feedback circuit which, in turn, is connected to a timing circuit. The timing circuit is rendered operative upon directing a current through the steering circuit to initiate the starting point of a timing pulse. This starting point of the timing pulse corresponds to the leading edge of the input pulse. Also connected to the output of the steering circuit is an integrating circuit which receives pulses to provide a tachometer reading. Although the input pulses to the flip-flop circuit are pulses of indiscriminate pulse width the output pulses thereof are pulses of a given pulse width as determined by the timing circuit. This type of circuit arrangement insures a more accurate tachometer reading since all that is required to produce a given-width pulse at the output is the leading edge or starting portion of a pulse at the input. Once the starting portion of the input pulse is received the tachometer circuit goes through a complete operation to produce the given-width pulse no matter how long the input pulse happens to be. This is accomplished by providing an input lockout circuit for shunting the remaining portions of the input signal. After the given-width pulse is generated the lockout circuit is rendered operative to cause the remainder of the input pulse to be shunted to ground potential together with any noise which may be associated therewith. This then eliminates indiscriminate noise which may be mixed with the input signal during that portion of the input signal which is greater in time duration than the given-width pulse. The given-width pulse, therefore, is of relatively short time duration.

DESCRIPTION OF THE ILLUSTRATED EMBODIMENTS

Figure 1:
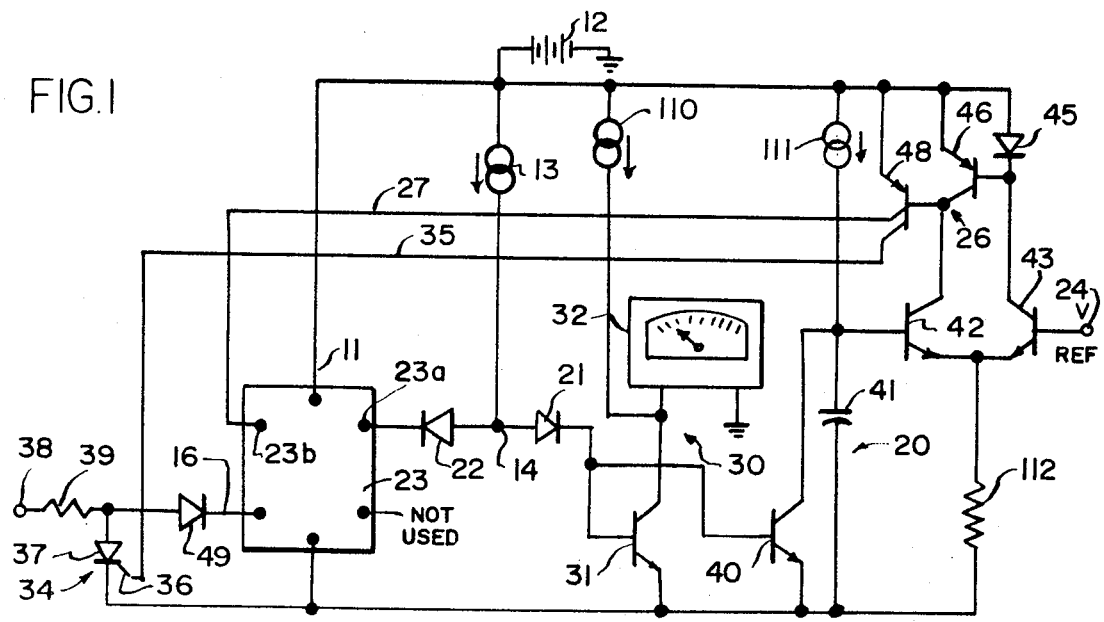
FIG. 1 is a schematic diagram of a tachometer circuit constructed in accordance with this invention and can be formed of discrete components or of integrated circuit configurations.

Referring now to FIG. 1 the tachometer circuit of this invention includes a steering circuit designated generally by reference numeral 10 which has a first circuit portion 11 connected to a power source 12 for operation therefrom. The power source 12 is also connected to an output circuit portion 14 via a constant current source 13 such that current is directed from the output terminal 14 to timing and integrating circuits 20 and 30, respectively, during one instance and diverted therefrom during a second instance when the steering circuit is activated. An input circuit portion 16 receives input pulse signals of indiscriminate pulse width as produced by any conventional magnetic pickup device, or the like. Only the leading edge or initial portion of each input pulse signal is utilized to change the state of the steering circuit and produce a given-width output pulse at terminal 14 and within the integrating circuit 30.

The timing circuit means is indicated generally by reference numeral 20 and is connected to the output circuit portion 14 via a blocking diode 21. The timing circuit 20 produces timing pulses which start each time the current from circuit point 14 is diverted from diode 21 into diode 22 upon the change of state of a flip-flop circuit 23, which forms part of the steering circuit 10. After a predetermined time interval, as determined by the charge rate of a capacitor 41 and the reference potential at terminal 24, the timing pulse is applied to a feedback circuit 26 and therefrom via a first line 27 to the flip-flop 23 to revert its state of conduction and produce a given-width pulse at the output terminal 14. This will produce a signal in the integrating circuit 30 which includes a power transistor 31, a current source 110 and an indicator 32. The tachometer reading on indicator 32 therefore corresponds to the number of given-width pulses per unit time. Regardless of the width of the pulses applied to the input circuit portion 16, accurate tachometer readings are always achieved because only given-width pulses are used to generate the tachometer reading.

To insure that no indiscriminate noise signals will be sensed by the circuit to cause an inaccurate reading, an input lockout circuit 34 is provided at the input circuit portion 16. A second feedback line 35 from the feedback circuit 26 is connected to the gate electrode 36 of a silicon controlled rectifier 37 to render it conductive whenever the anode thereof is positive with respect to the cathode, this positive potential being supplied by the input pulse. That is, when an input signal is at input terminal 38, and coupled through a resistor 39, the anode of silicon controlled rectifier 37 is positive. When a gate signal is applied to the gate 36 the silicon controlled rectifier becomes highly conductive and all further input signal information, together with any noise which may be mixed therewith, is shunted to ground potential. Therefore, by selecting a relatively short time interval for the given-width pulse a very accurate tachometer reading is achieved.

Initially, the output terminal 23a of the flip-flop circuit 23 is in a high state, this meaning that the cathode of diode 22 is positive with respect to its anode. The diode 22 is then reverse biased and current flow from output terminal 14 is blocked from the flip-flop circuit 23. Therefore, current from the power source 12 flows through constant current source 13, and the diode 21 to forward bias the transistors 31 and 40 of the integrating and timing circuit respectively. Transistor 40 is therefore rendered highly conductive to apply substantially ground potential to the upper plate of a capacitor 41. During this saturated conduction of transistor 40 the maximum potential across capacitor 41 is only the forward voltage drop between the collector emitter junctions of the transistor. With this low voltage across capacitor 41 the base electrode of a transistor 42 is well below the base voltage of a second transistor 43 which, together with the transistor 42, forms a differential amplifier or comparator circuit. A reference potential, either fixed or variable, is applied to the terminal 24 and thus sets the operating time duration of the timing circuit.

With the transistor 43 highly conductive, a transistor 46 of the feedback circuit 26, is held to its saturation state but minimum current flow is achieved as a result of nonconduction of transistor 42, resistor 112 and diode 45. Also during this initial condition silicon controlled rectifier 37 of the input lockout circuit 34, is in the unlatched or nonconductive state. When an input pulse is applied to terminal 38 which is then translated to the input circuit portion 16, the state of flip-flop circuit 23 changes so that output terminal 23a thereof goes to a low condition, this corresponding to a grounded or negative voltage to forward bias the diode 22. At this time current flow from constant current source 13 flows through diode 22 and is diverted from flowing through diode 21. This action will cause both the transistors 31 and 40 to become nonconductive thus starting the initiation of a timing pulse as capacitor 41 begins to charge linearly due to constant current source 111. The capacitor 41 will continue to form a ramp or sawtooth pulse until the voltage at the base electrode of transistor 42 reaches a value that is substantially equal to the value of the reference potential at terminal 24. This will then render transistor 42 conductive which, in turn, will render transistor 48 conductive to deliver a feedback signal to an input terminal 23b of the flip-flop 23. The transistor 48 is provided with two collector electrodes so that isolation may be achieved between two different feedback current paths. The feedback signal from transistor 48 is also delivered to the gate electrode 36 of silicon controlled rectifier 37. A series connected diode 49 serves to isolate the silicon controlled rectifier 37 from the input circuit portion 16 of the flip-flop 23.

When the output terminal 23a of the flip-flop 23 again goes to the high voltage state, the current through line 13 is again directed through the diode 21 to the base electrodes of transistors 31 and 40 to again render them highly conductive. This action will quickly discharge capacitor 41 to a low voltage state, i.e., that of the forward voltage drop across transistor 40, and produce a given-width pulse in the integrating circuit 30. The input pulse at terminal 38 must terminate before silicon controlled rectifier 37 is rendered nonconductive to again be in the ready or unlatched condition. The number of given-width pulses per unit time will then provide the accurate tachometer reading necessary for maximum engine efficiency.

Figure 2:
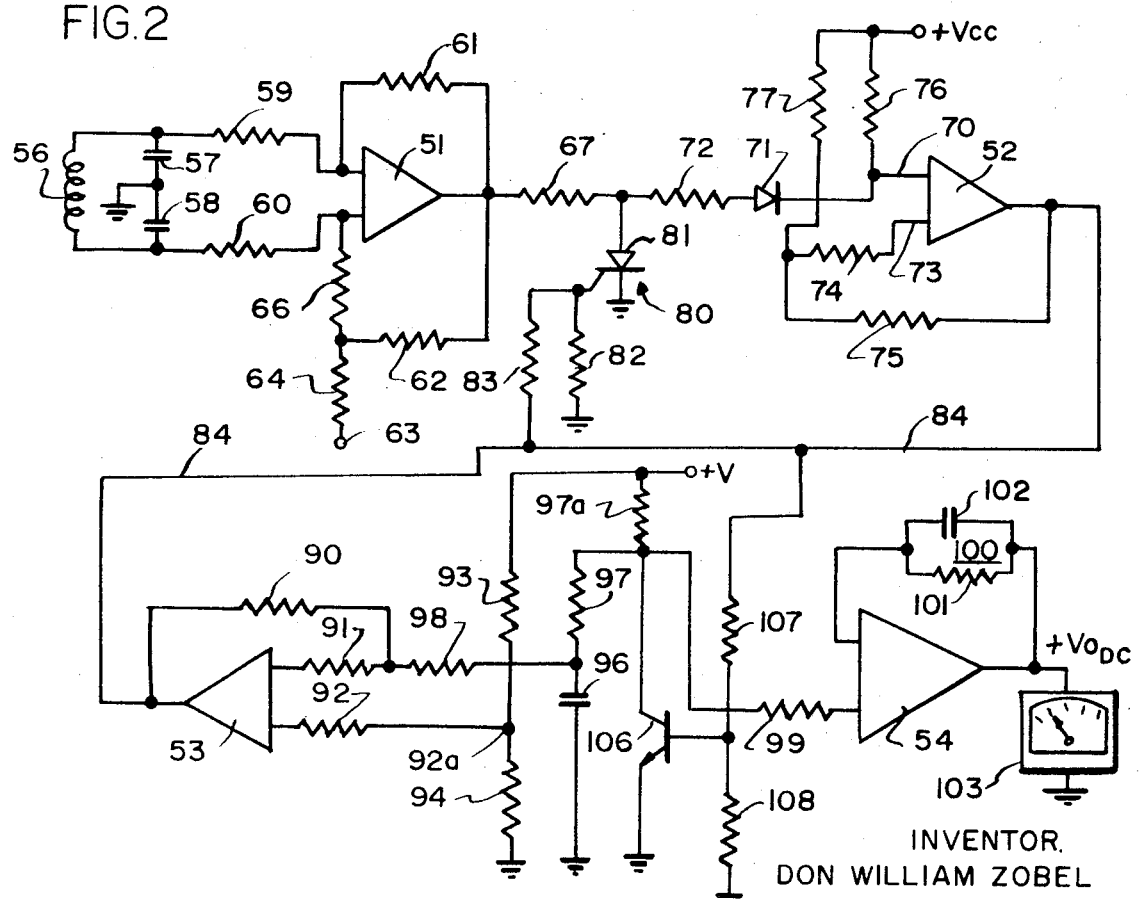
FIG. 2 is a tachometer circuit using the same basic circuit configuration but wherein most circuit components are formed of integrated operational amplifiers.

Referring now to FIG. 2, an alternate form of the tachometer circuit is constructed in accordance with the principles of this invention. Here a plurality of operational amplifiers 51, 52, 53 and 54 provide the necessary active circuit elements for proper operation. Operational amplifiers are considered building blocks of integrated circuit technology and may include several different circuit configurations. The particular operational amplifiers disclosed herein may be of the type where all of the voltage gain is provided by a single common emitter amplifier and the inverting input thereof is simply the base of a gain transistor. Other configurations for operational amplifiers may be used.

The operational amplifier 51 forms an input amplifier stage of the tachometer circuit and receives input pulse signals from a pickup coil 56 which is shunted by a pair of capacitors 57 and 58 having their common connection connected to ground potential. The input signal from coil 56 is delivered across a pair of resistors 59 and 60 to the input terminals of operational amplifier 51. The input to operational amplifier 51 is a balanced input which has a center ground connected through capacitors 57 and 58. A pair of feedback resistors 61 and 62 are connected from the output of operational amplifier 51 back to the inputs thereof to form symmetrical hysterisis around the zero crossing of the input signal. Operating potential is applied to the input amplifier stage via terminal 63 and a pair of resistors 64 and 66. The output of operational amplifier 51 is delivered through a resistor 67 to a flip-flop stage which is formed by the operational amplifier 52. The pulse signal delivered through resistor 67 is still of the same pulse width as that generated by the pickup 56 and may include some noise characteristics superimposed on the input signal.

The flip-flop stage formed by operational amplifier 52 includes a first input terminal 70 coupled to a series connected diode 71 and resistor 72 for passing the input signal. A second input terminal 73 receives a feedback signal through resistors 74 and 75 which hold the circuit in its then latched or switched condition until a subsequent signal is applied thereto. Operating bias is supplied to the inputs 70 and 73 via resistors 76 and 77, respectively. The input path to the flip-flop stage also has an input lockout circuit 80 which comprises a silicon controlled rectifier 81 having its gate electrode coupled to a voltage developing resistor 82 and which receives gate signals from the output of the operational amplifier 52 via resistor 83. However, the signal from operational amplifier 52 is one which goes negative during initial operation and will have no effect on the gate of the silicon controlled rectifier 81. On the other hand, a positive feedback signal from the operational amplifier 53 delivered through line 84 will render silicon controlled rectifier 81 highly conductive and short circuit any further input signal, as well as superimposed noise coming from the input amplifier 51.

A comparator stage is formed by operational amplifier 53 which has a feedback resistor 90 and its pair of input resistors 91 and 92. Operating bias is received from a voltage divider network formed by resistors 93 and 94 which has the center tap thereof connected to resistor 92 to set the reference potential for the comparator circuit. The output or feedback signal from operational amplifier 53 is obtained upon sensing the linear charge across a capacitor 96 as applied through the resistors 91 and 98. Capacitor 96 operates substantially in the same manner as capacitor 41 of FIG. 1. When the charge on capacitor 96 reaches a certain value, which is compared with the voltage value at circuit point 92a, the output or feedback signal is then produced. However, in this instance a series connected resistor 97 forms the RC time constant with capacitor 96 and sets the rate of charge, or time duration, for each feedback signal to occur. This also produces a given-width pulse at the juncture of resistors 97 and 97a to be applied to the input of operational amplifier 54 via the resistor 99. The given-width pulse through resistor 99 is then integrated in an averaging circuit formed by the operational amplifier 54 and its associated feedback network 100 which includes a resistor 101 and a capacitor 102. The averaging circuit then operates a meter movement 103 which, in turn, is calibrated to give a tachometer reading in RPM.

A transistor 106 is connected in parallel with the resistor 97 and capacitor 96 to shunt current therefrom when the transistor is highly conductive, which is the case when no signal is applied to the input winding 56. The transistor 106 acts as a clamping circuit. During this normal output condition of operational amplifier 52 a positive voltage is on line 84 and is developed across a pair of biasing resistors 107 and 108 to forward bias the base electrode of transistor 106. This renders the transistor highly conductive. However, the positive voltage on line 84 is not sufficient, because of the high resistance of resistor 83, to provide a firing potential at the gate electrode of the silicon controlled rectifier 81. When an input signal is applied to the winding 56 the output signal of operational amplifier 52 becomes a negative going pulse which reverse biases the base junction of transistor 106 to render it nonconductive. This will allow capacitor 96 to charge linearly through resistor 97. Capacitor 96 will continue to charge until the appropriate comparison potential is reached at which time an output signal is developed from operational amplifier 53. This output potential is an increased positive potential sufficient to gate on silicon controlled rectifier 81 and shunt any further portion of the input pulse which may be passing from resistor 67 to resistor 72. The increased positive voltage on line 84 is also delivered back to operational amplifier 52 and through the feedback resistor 75. It then switches back to its initial operating condition so that a normal positive voltage is developed across resistors 107 and 108 to again render transistor 106 highly conductive. Upon termination of the input pulse silicon controlled rectifier 81 will be rendered nonconductive and will be in readiness for a subsequent pulse operation.

What has been described is a simple circuit arrangement whereby tachometer readings are accurately obtained in an electronic tachometer circuit by having extraneous noise signals together with that portion of the input pulse which is not needed shorted to ground potential.

I claim:

1. A tachometer circuit comprising in combination,
   an input circuit portion for receiving periodic input pulses which are indicative of the motion of a movable member,
   timing circuit means connected to said input circuit portion to be responsive to the leading edge of each input pulse to cause the start of a timing pulse, said timing circuit means including means to produce a feedback pulse after a predetermined time interval,
   means coupling said timing circuit means to said input circuit means to apply said feedback pulse thereto to produce a given-width pulse,
   integrating circuit means responsive to said given-width pulse to produce a tachometer reading corresponding to the number of said given-width pulses per unit time,
   and input lockout means connected to said input circuit portion and to said timing circuit means, said lockout means being responsive to said feedback pulse to thereafter shunt that portion of said input pulse in said input circuit portion which exceeds the time duration of said given-width pulse.

2. The tachometer circuit of claim 1 wherein said input lockout means includes a silicon controlled rectifier having a gate electrode and an anode-cathode circuit connected between said input circuit portion and ground potential, and feedback circuit means connected between said timing circuit and said gate electrode of said silicon controlled rectifier to render the same conductive during the presence of an input pulse after the predetermined time interval, with the termination of said input pulse causing de-energization of said silicon controlled rectifier.

3. The tachometer circuit of claim 1 further including reference circuit means connected to said timing circuit means to set the time duration of the timing pulses produced thereby.

4. The tachometer circuit of claim 1 wherein said input circuit portion includes a flip-flop circuit having set and reset input terminals and an output terminal, said periodic input pulses being applied to said set input terminal, and feedback means connected from said timing circuit means to said reset terminal to reset said flip-flop at the end of said given-width pulse, and series connected back-to-back diodes connected between said output terminal of said flip-flop circuit and the inputs of said timing and integrating circuit means.

5. The tachometer circuit of claim 1 wherein said input circuit portion includes an input amplifier and a flip-flop stage each formed by similar operational amplifiers, and said input lockout means is connected between said input amplifier and said flip-flop stage to shunt that portion of said input pulse which exceeds the time duration of said given width pulse.

6. A tachometer circuit for use with a current source and including in combination:
   a current steering circuit having a first circuit portion connected to the current source, an input circuit portion for receiving periodic input pulses which are indicative of the motion of a movable member, and an output circuit portion into which current is alternately directed from the current source and diverted therefrom upon the application of said input pulses;
   timing circuit means connected to said output circuit portion and responsive to the leading edge of said input pulse to cause the start of a timing pulse when current is diverted from said output circuit portion and which terminates after a predetermined time interval;
   feedback means for applying said timing pulse to said current steering to revert its state to again cause current to be directed into said output circuit portion thus producing a given-width pulse at said output circuit portion; and
   integrating circuit means responsive to said given-width pulses to integrate the same and produce a tachometer reading corresponding to the number of said given-width pulses per unit time.

7. The tachometer circuit of claim 6 further including input lockout means connected to said input circuit portion and responsive to the termination of said timing pulse to shunt that portion of said input pulse which exceeds the time duration of said given-width pulse.

8. The tachometer circuit of claim 7 wherein said input lockout means includes a silicon controlled rectifier having the anode-cathode circuit thereof connected between said input circuit portion and ground potential and the gate circuit thereof connected to said feedback means.

9. The tachometer circuit of claim 6 further including a reference circuit means connected to said timing circuit means to set the time duration of said timing pulse.

10. A tachometer circuit comprising in combination, an input amplifier stage including a first operational amplifier for receiving input pulses of indiscriminate pulse width which are indicative of the motion of a moving member, a flip-flop circuit formed by a second operational amplifier, said flip-flop circuit having a first input connected to said input amplifier for changing its state of conduction during the initial rise time of a given input pulse, a comparator circuit formed by a third operational amplifier, said comparator connected to said flip-flop and providing a reference potential to produce a timing pulse output signal, a clamping circuit connected to said comparator to clamp the starting potential of said timing pulse to a predetermined voltage value, and to produce a given-width pulse in response to said timing pulse, and a pulse averaging circuit connected to said clamping circuit to receive said given-width pulse to produce a tachometer reading corresponding to the number of said given-width pulses per unit time.

11. The tachometer circuit of claim 10 wherein said comparator circuit and said clamping circuit receive an input signal over a common line connected to the output of said flip-flop.

12. The tachometer circuit of claim 10 wherein said flip-flop circuit includes a feedback path connected to a second input terminal thereof for resetting the same upon change of polarity from the timing pulse output signal of said comparator circuit.

* * * * *